(12) United States Patent
Hill et al.

(10) Patent No.: US 10,807,556 B2
(45) Date of Patent: Oct. 20, 2020

(54) VEHICLE AIRBAG

(71) Applicant: Ford Global Technologies, LLC, Dearborn, MI (US)

(72) Inventors: Anna Miller Hill, Belleville, MI (US); Brian Robert Spahn, Plymouth, MI (US); Paul Alan Forgette, Brownstown, MI (US); Jeffrey Charles Paddock, Dearborn Heights, MI (US); Benjamin Yilma, Canton, MI (US); Robert Ralph Armitage, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/968,175

(22) Filed: May 1, 2018

(65) Prior Publication Data

US 2019/0337479 A1 Nov. 7, 2019

(51) Int. Cl.
*B60R 21/232* (2011.01)
*B60R 21/26* (2011.01)
*B60R 21/015* (2006.01)
*B60R 21/231* (2011.01)
*B60R 21/01* (2006.01)

(52) U.S. Cl.
CPC ...... *B60R 21/232* (2013.01); *B60R 21/01512* (2014.10); *B60R 21/26* (2013.01); *B60R 2021/01034* (2013.01); *B60R 2021/01245* (2013.01); *B60R 2021/23107* (2013.01); *B60R 2021/23153* (2013.01); *B60R 2021/23161* (2013.01)

(58) Field of Classification Search
CPC .............................. B60R 21/232; B60R 21/26
See application file for complete search history.

(56) References Cited

U.S. PATENT DOCUMENTS

| | | | | |
|---|---|---|---|---|
| 2,834,606 | A * | 5/1958 | Bertrand | B60R 21/16 206/522 |
| 5,333,899 | A * | 8/1994 | Witte | B60R 21/23138 280/728.1 |
| 5,775,726 | A * | 7/1998 | Timothy | B60R 21/013 280/730.1 |
| 7,726,684 | B2 * | 6/2010 | Breed | B60R 21/205 280/729 |
| 8,220,829 | B2 * | 7/2012 | Choi | B60R 21/214 280/728.2 |
| 9,321,423 | B2 | 4/2016 | Jaradi et al. | |
| 9,428,138 | B2 * | 8/2016 | Farooq | B60R 21/231 |

(Continued)

FOREIGN PATENT DOCUMENTS

| DE | 10039800 B4 | 3/2013 |
|---|---|---|
| DE | 102014002813 A1 | 8/2014 |

(Continued)

*Primary Examiner* — Faye M Fleming
(74) *Attorney, Agent, or Firm* — Frank A. MacKenzie; Bejin Bieneman PLC

(57) ABSTRACT

A vehicle includes a roof. The vehicle includes a first row and a second row of airbags supported by the roof and elongated along a vehicle-longitudinal axis. The vehicle includes a third row and a fourth row of airbags supported by the roof, elongated along a vehicle-lateral axis, and intersecting the first row and the second row of airbags.

19 Claims, 7 Drawing Sheets

(56) References Cited

U.S. PATENT DOCUMENTS

| | | | |
|---|---|---|---|
| 9,463,760 B2 | 10/2016 | Choi et al. | |
| 9,610,915 B2 * | 4/2017 | Specht | B60R 21/214 |
| 9,789,840 B2 | 10/2017 | Farooq et al. | |
| 10,246,043 B2 * | 4/2019 | Schneider | B60R 21/214 |
| 2011/0049845 A1 * | 3/2011 | Choi | B60R 21/214 |
| | | | 280/728.2 |
| 2018/0312130 A1 * | 11/2018 | Min | B60R 21/233 |
| 2019/0210552 A1 * | 7/2019 | White | B60R 21/213 |

FOREIGN PATENT DOCUMENTS

| | | | |
|---|---|---|---|
| JP | 2004249845 A | * | 9/2004 |
| JP | 3821076 B2 | | 9/2006 |
| JP | 2012011921 A | * | 1/2012 |
| KR | 20090007103 | | 1/2009 |

\* cited by examiner

VEHICLE AIRBAG

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1:
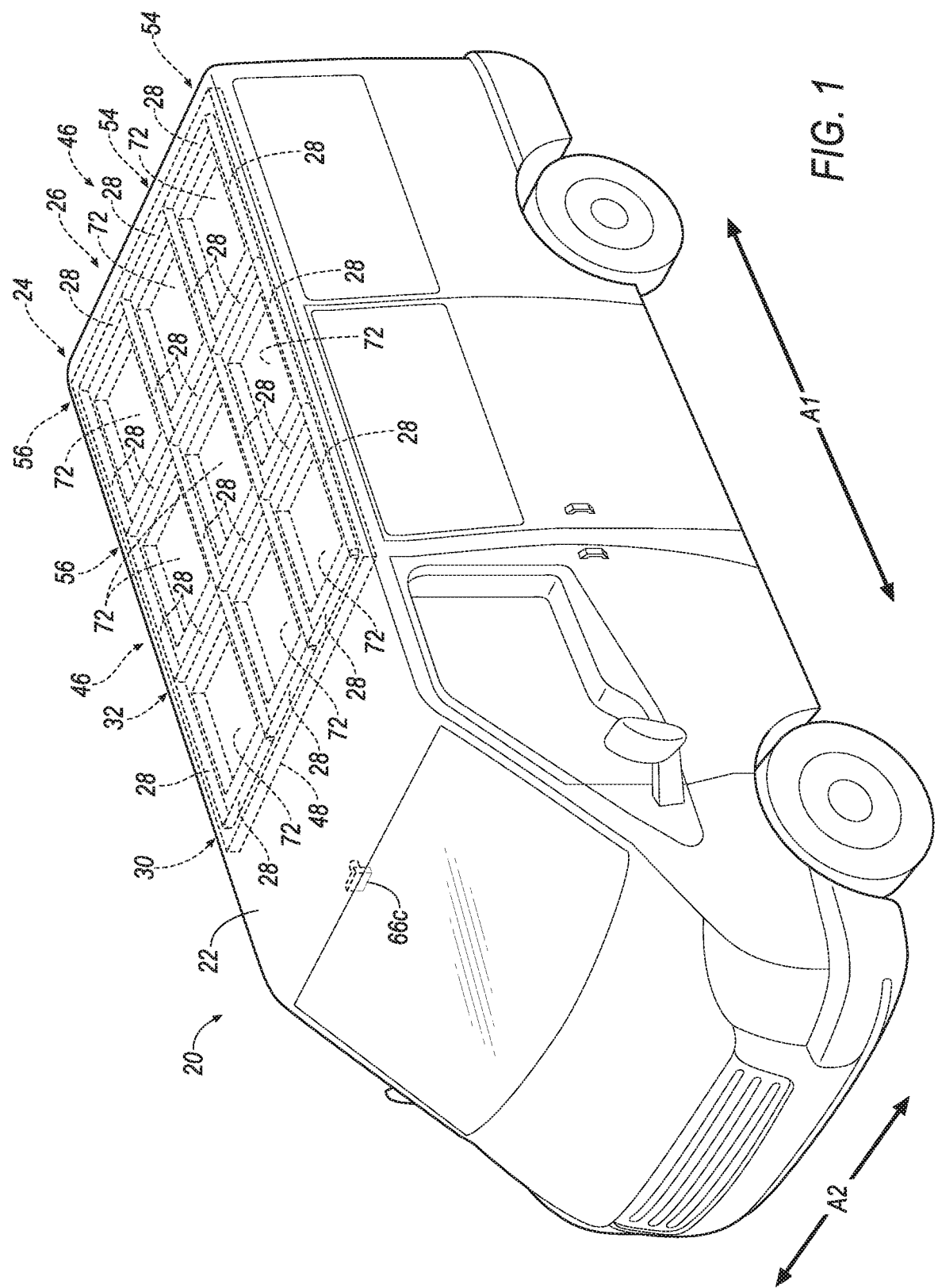
FIG. 1 is a perspective view of a vehicle having rows of airbags with the airbags in uninflated positions.
Figure 2:
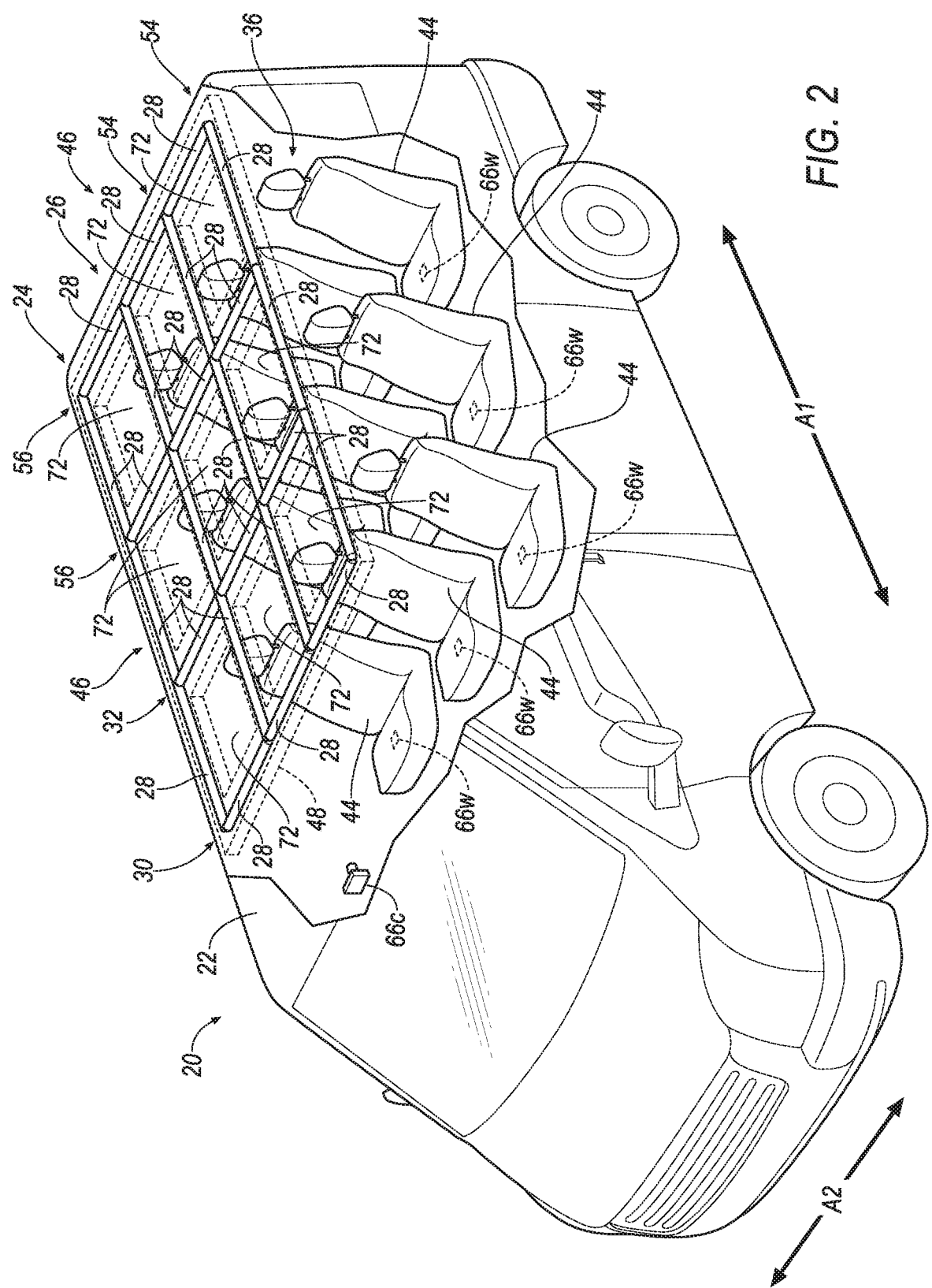
FIG. 2 is a perspective view of the vehicle having the rows of the airbags with the airbags in the uninflated positions.

A vehicle includes a roof. The vehicle includes a first row and a second row of airbags supported by the roof and elongated along a vehicle-longitudinal axis. The vehicle includes a third row and a fourth row of airbags supported by the roof, elongated along a vehicle-lateral axis, and intersecting the first row and the second row of airbags.

The vehicle may include a first seat and a second seat spaced from each other along the vehicle-lateral axis, and one of the airbags of the first row may be inflatable to an inflated position between the first seat and the second seat.

The vehicle may include a first seat and a second seat spaced from each other along the vehicle-longitudinal axis, and one of the airbags of the third row may be inflatable to an inflated position between the first seat and the second seat.

The vehicle may include a third seat spaced from the first seat along the vehicle-lateral axis, and one of the airbags of the first row may be inflatable to an inflated position between the first seat and the third seat.

The vehicle may include a passenger cabin, a processor, and a memory storing program instructions executable by the processor to actuate one or more airbags of the first row, the second row, the third row, or the fourth row based on a detected position of an occupant in passenger cabin.

The memory may store program instructions executable by the processor to actuate one or more valves between an inflator and one or more airbags of the first row, the second row, the third row, or the fourth row based on a detected position of an occupant in passenger cabin.

The vehicle may include a seat, and one airbag of each the first row, the second row, the third row, and the fourth row may be inflatable to inflated positions and collectively define a polygon surrounding the seat in the inflated positions.

The vehicle may include a fifth row of airbags elongated along the vehicle-longitudinal axis and intersecting the third row and the fourth row of airbags.

The vehicle may include a sixth row of airbags elongated along the vehicle-lateral axis and intersecting the first row, the second row, and the fifth row of airbags.

One airbag of the first row may be releasably fixed to another airbag of the first row.

One airbag of the first row may be releasably fixed to one airbag of the third row.

An assembly includes a first row and a second row of airbags elongated along a first axis. The assembly includes a third row and a fourth row of airbags elongated along a second axis perpendicular to the first axis, and intersecting the first row and the second row of airbags.

The first row, the second row, the third row, and the fourth row of airbags may define a plurality of rectangles.

One airbag of the first row may be releasably fixed to another airbag of the first row.

One airbag of the first row may be releasably fixed to one airbag of the third row.

One airbag of the first row may be releasably fixed to one airbag of the third row and one airbag of the fourth row.

The one airbag of the first row may be releasably fixed to another airbag of the first row with breakaway stitching.

One airbag of each the first, the second row, the third row, and the fourth row may be inflatable to inflated positions and collectively define a polygon in the inflated positions.

The assembly may include a fifth row of airbags elongated along the first axis and intersecting the third row and the fourth row of airbags.

The assembly may include a sixth row of airbags elongated along the second axis and intersecting the first row, the second row, and the fifth row of airbags.

With reference to the Figures, wherein like numerals indicate like parts throughout the several views, a vehicle 20 includes a roof 22, and a first row 24 and a second row 26 of airbags 28 supported by the roof 22. The first row 24 and second row 26 of airbags 28 are elongated along a vehicle-longitudinal axis A1. The vehicle 20 includes a third row 30 and a fourth row 32 of airbags 28 supported by the roof 22, elongated along a vehicle-lateral axis A2. The third row 30 and fourth row 32 of airbags 28 intersect the first row 24 and the second row 26 of airbags 28. The airbags 28 of the intersecting rows 24, 26, 30, 32 are selectivity inflatable, e.g., based on positions of occupants 34 of the vehicle 20, e.g., to increase the effectiveness of controlling kinematics of such occupants 34 inside the vehicle 20 during a vehicle impact.

The numerical adjectives "first," "second," "third," etc., are used throughout this document as identifiers and are not intended to signify importance or order.

The vehicle 20 may be any passenger or commercial automobile such as a car, a truck, a sport utility vehicle, a crossover vehicle, a van, a minivan, a taxi, a bus, etc.

The vehicle 20 defines the vehicle-longitudinal axis A1, i.e., extending between a front and a rear of the vehicle 20. The vehicle 20 defines the vehicle-lateral axis A2, i.e., extending between a left side and a right side of the vehicle 20. The vehicle-longitudinal axis A1 and the vehicle-lateral axis A2 may be perpendicular to each other. The front, rear, left side, and right side may be relative to an orientation of an operator of the vehicle 20. The front, rear, left side, and right side may be relative to an orientation of controls for operating the vehicle 20, e.g., an instrument panel, etc. The front, rear, left side, and right side may be relative to a forward driving direction when wheels of the vehicle 20 are all parallel with each other.

The vehicle 20 defines a passenger cabin 36. The passenger cabin 36 may be occupied by one or more occupants 34 of the vehicle 20.

The roof 22 provides cover for occupants 34 of the passenger cabin 36. The roof 22 may include cross-beams 38, an exterior panel 40, and a headliner 42. The cross-beams 38 support the exterior panel 40, the headliner 42, etc. The cross-beams 38 may be steel, aluminum, carbon fiber, or any other suitable material. The cross-beams 38 may be elongated along the vehicle-lateral axis A2. The headliner 42 and the exterior panel 40 provide class-A surfaces to the roof 22, i.e., surfaces specifically manufactured to have a high-quality, finished aesthetic appearance free of blemishes, etc.

The headliner 42 may include tear seams. The tear seams are designed to rupture upon inflation of the one or more of the airbags 28. The tear seams may be weaker than a portion of the headliner 42 adjacent the tear seams, e.g., the tear seams may be thinner, a weaker material, etc. The tear seams may connect panels of the headliner 42, e.g., with break-away stitches. The tear seams may extend along the vehicle-longitudinal axis A1 and/or the vehicle-lateral axis A2.

The vehicle 20 may include one or more seats 44. The each of the seats 44 shown is a bucket seat, but alternatively the seats 44 may be a bench seat 44 or another type of seat 44. The seats 44 may be supported by a floor of the vehicle 20.

The seat 44 may include a seat back, a seat bottom, and a headrest. The headrest may be supported by the seat back and may be stationary or movable relative to the seat back. The seat back may be supported by the seat bottom and may be stationary or movable relative to the seat bottom. The seat back, the seat bottom, and/or the headrest may be adjustable in multiple degrees of freedom. Specifically, the seat back, the seat bottom, and/or the headrest may themselves be adjustable, in other words, adjustable components within the seat back, the seat bottom, and/or the headrest, and/or may be adjustable relative to each other.

The seats 44 may be along the vehicle-lateral axis A2. For example, the seats 44 may be arranged in rows extending between the right side and the left side of the vehicle 20. For example, some of the seats 44 may be spaced along the vehicle-lateral axis A2 at a common distance from the front of the vehicle 20. The seats 44 may be spaced from each other along the vehicle-lateral axis A2.

The seats 44 may be spaced from each other along the vehicle-longitudinal axis A1. For example, one of the seats 44 may be in front of another of the seats 44. To put it another way, one of the seats 44 may be closer to the front of the vehicle 20 than another of the seats 44. For example, the seats 44 may be arranged in multiple rows, e.g., a first row, a second row, etc., between the front and the rear of the vehicle 20. The first row may be in front of the second row. To put it another way, the first row may be between the second row and the front of the vehicle 20.

The vehicle 20 may include an airbag assembly 46. The airbag assembly 46 may include a housing 48, one or more inflators 50, and the airbags 28. The airbags 28 are independently inflatable from uninflated positions to inflated positions, e.g., the inflators 50 may actuate to inflate the airbags 28 in response to an instruction received from a computer 52. In other words, any one or more of the airbags 28 may be inflated based on the position of one or more occupants in the passenger cabin 36. The inflators 50 and the airbags 28 may be disposed in the housing 48 in the uninflated positions, as shown in FIGS. 1-5.

Figure 3:
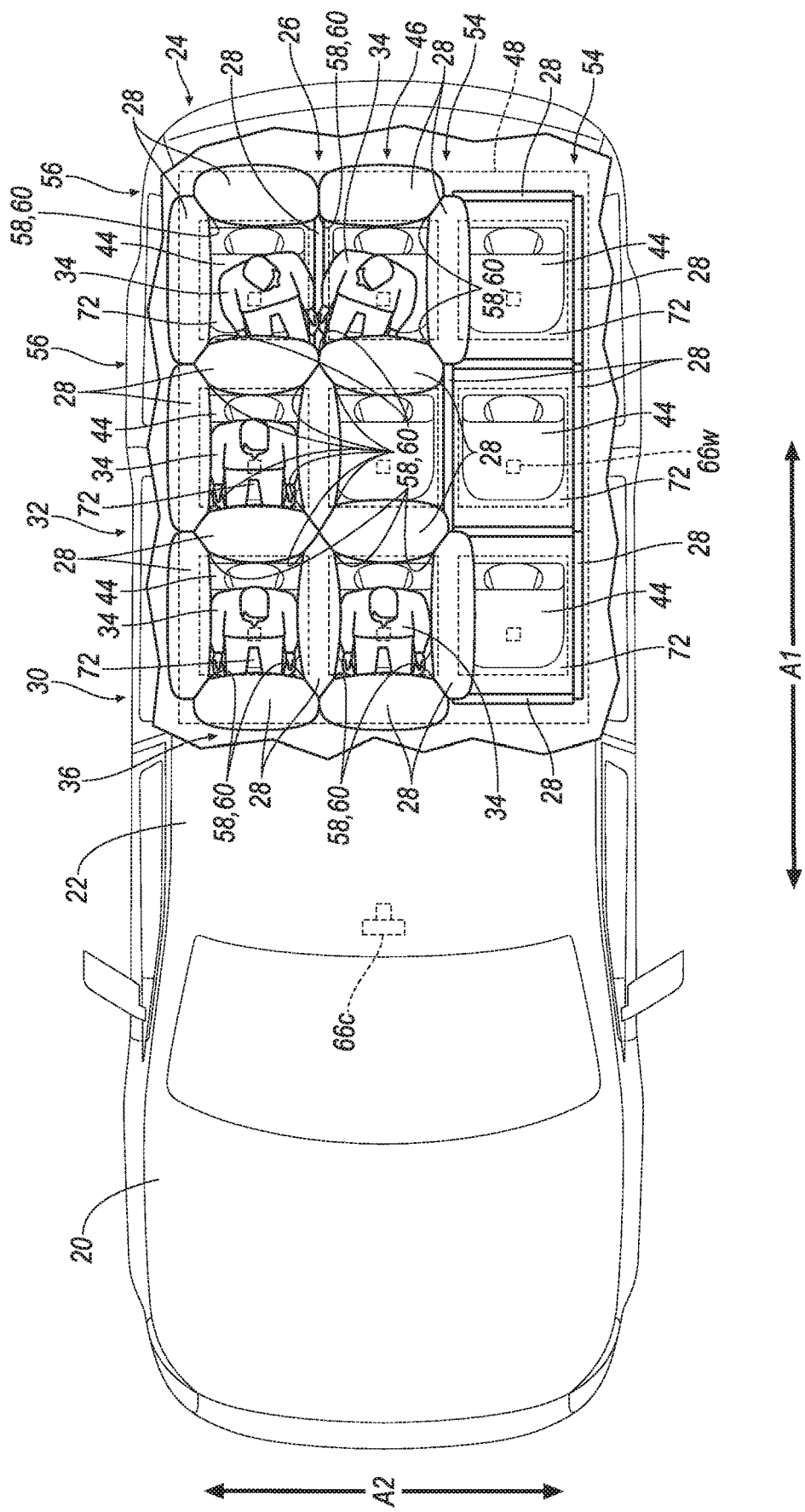
FIG. 3 is a top view of the vehicle having the rows of the airbags with the airbags in the uninflated positions and in inflated positions.
Figure 4:
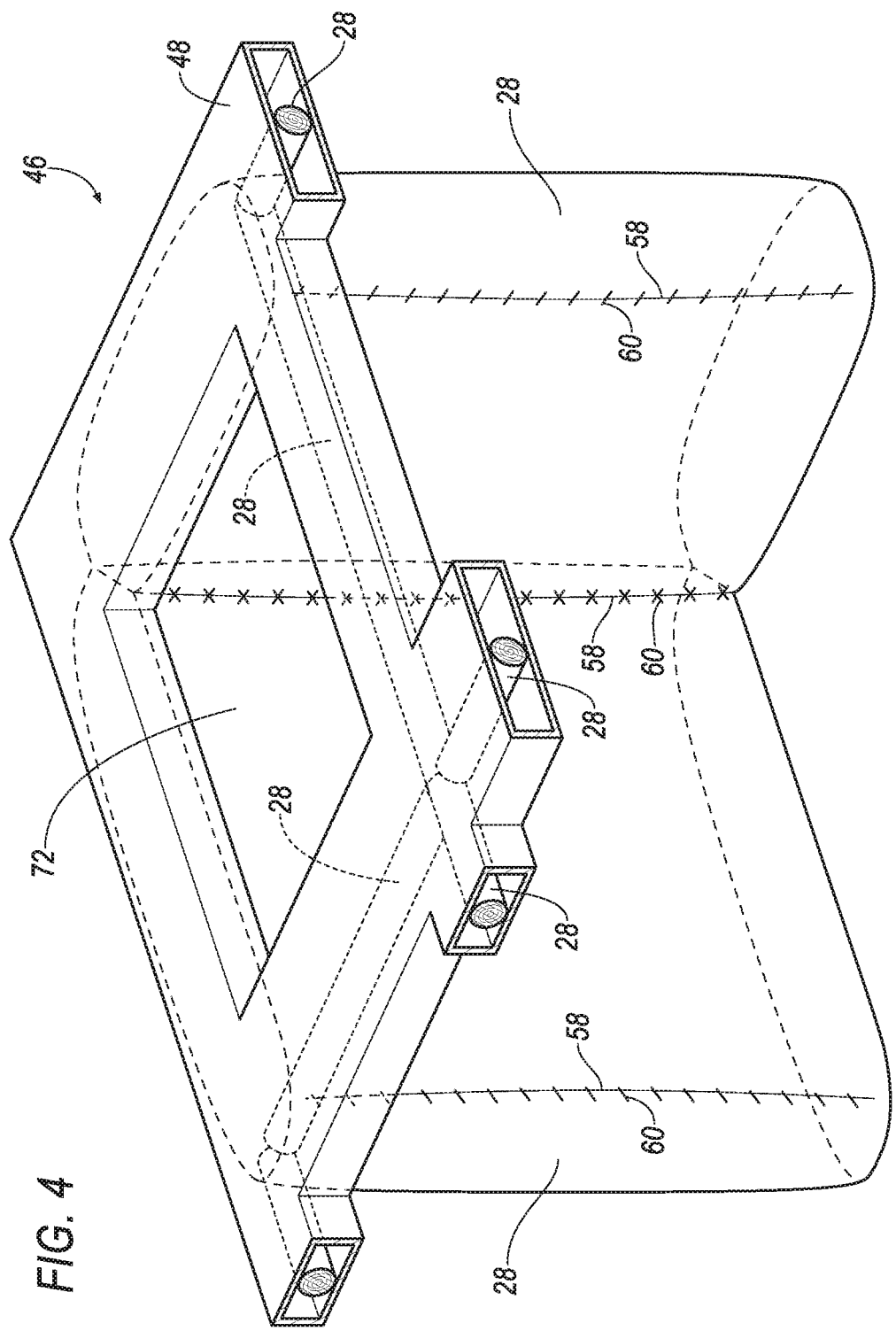
FIG. 4 is a perspective view of a portion of the rows of airbags with the airbags in the uninflated positions and in the inflated positions.
Figure 5:
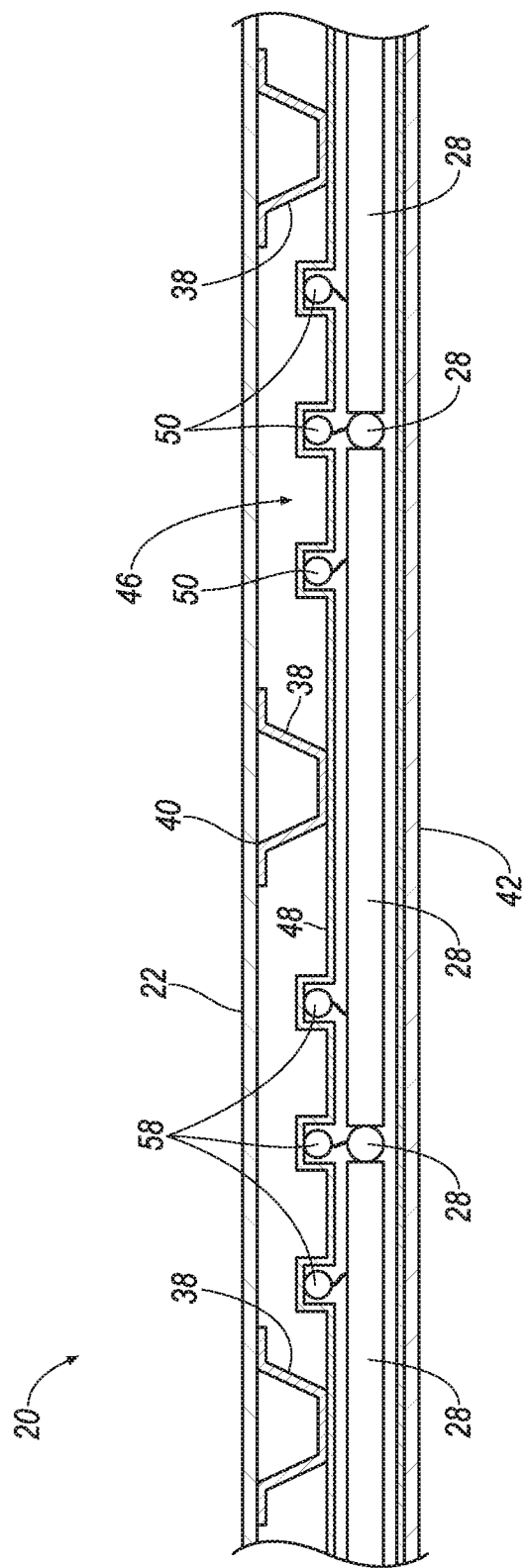
FIG. 5 is a cross section of a roof of the vehicle with the airbags in the uninflated positions.

The housing 48 provides a reaction surface for the airbags 28 in the inflated positions, as shown in FIGS. 3 and 4. The housing 48 may be supported by the roof 22 or at any other suitable location of the vehicle 20. For example, the housing 48 may be fixed to one or more of the cross-beams 38, e.g., with fasteners, etc., as shown in FIG. 5. The housing 48 may be under the cross-beams 38. To put it another way, the housing 48 may be between the cross-beams 38 and the headliner 42. The housing 48 may be any material, e.g., a rigid polymer, a metal, a composite, etc. Although all the airbags 28 are shown supported by the single housing 48, it is to understood that multiple housings 48 may support the airbags 28, e.g., some of the airbags 28 may be supported by one housing, and other airbags 28 may be supported by another housing.

Each airbag 28 may be formed of a woven polymer or any other material. As one example, the airbags 28 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The airbags 28 are supported by the roof 22. For example, the airbags 28 may be fixed to the housing 48 supported by the roof 22. The airbags 28 may be arranged into rows, e.g., the first row 24, the second row 26, the third row 30, the forth row 32, a fifth row 54, a sixth row 56, etc. Some of the rows 24, 26, 54 of the airbags 28 are elongated along a first axis, e.g., the vehicle-longitudinal axis A1. Some of the rows 30, 32, 56 of the airbags 28 are elongated along a second axis perpendicular to the first axis, e.g., the vehicle-lateral axis A2. The rows 24, 26, 54 of airbags 28 elongated along the first axis, e.g., the vehicle-longitudinal axis A1, intersect the rows 30, 32, 56 of airbags 28 elongated along the second axis, e.g., the vehicle-lateral axis A2. For example, the rows 24, 26, 54 of airbags 28 elongated along the first axis, e.g., the vehicle-longitudinal axis A1, and the rows 30, 32, 56 of airbags 28 elongated along the second axis, e.g., the vehicle-lateral axis A2, may define a plurality of rectangles. To put it another way, the rows 24, 26, 54 of airbags 28 elongated along the first axis, e.g., the vehicle-longitudinal axis A1, and the rows 30, 32, 56 of airbags 28 elongated along the second axis, e.g., the vehicle-lateral axis A2, may be arranged in a grid.

Each airbag 28 in the inflated position extends downward from the roof 22 to the front, back, and/or sides of one or more occupants 34 of vehicle 20. To put it another way, each airbag 28 in the inflated position may extend from the roof 22 toward the floor. One of the airbags 28 of the rows 24, 26, 54 of airbags 28 elongated along the first axis, e.g., the vehicle-longitudinal axis A1, in the inflated position may be between seats 44 of one of the rows of seats 44. To put it another way, seats 44 of one of the rows of seats 44 may be on opposite sides of one of the airbags 28 of the rows 24, 26, 54 of airbags 28 elongated along the vehicle-longitudinal axis A1 in the inflated position. One of the airbags 28 of the rows 30, 32, 56 of airbags 28 elongated along the second axis, e.g., the vehicle-lateral axis A2, in the inflated position may be between one of the seats 44 of one of the rows of seats 44 and one of the seats 44 of another of the row of seats 44. To put it another way, the airbag 28 of one the rows 30, 32, 56 of airbags 28 elongated along the vehicle-lateral axis A2 may be between the first row of seats 44 and the second row of seats 44, between the second row of seats 44 and the third row of seats 44, etc., in the inflated position.

The airbags 28 in the inflated position may surround one or more of the seats 44, as shown in FIG. 4. For example, one airbag 28 from one of the rows 24, 26, 54 of airbags 28 elongated along the vehicle-longitudinal axis A1, one airbag 28 from another of the rows 24, 26, 54 of airbags 28 elongated along the vehicle-longitudinal axis A1, one airbag 28 from one of the rows 30, 32, 56 of airbags 28 elongated along the vehicle-lateral axis A2, and one airbag 28 from another of the rows 30, 32, 56 of airbags 28 elongated along the vehicle-lateral axis A2 in the inflated positions may collectively define a polygon. One or more of the seats 44 may be within such polygon.

The airbags 28 may be releasably fixed to each other. For example, one of the airbags 28 of one of the rows 24, 26, 54 of airbags 28 elongated along the vehicle-longitudinal axis A1 may be releasably fixed to another airbag 28 of such row. As another example, one of the airbags 28 of one of the rows 30, 32, 56 of airbags 28 elongated along the vehicle-lateral axis A2 may be releasably fixed to another airbag 28 of the row. As a final example, one of the airbags 28 of one of the rows 30, 32, 56 of airbags 28 elongated along the vehicle-lateral axis A2 may be releasably fixed to one of the airbags 28 of one of the rows 24, 26, 54 of airbags 28 elongated along the vehicle-longitudinal axis A1.

The airbags 28 may be releasably fixed to each other along a vertically extending side edge 58 of one of the airbags 28 in the inflated positions. For example, break-away stitching 60 may be used to fix the vertically extending side edge 58 of one airbag 28 to a vertically extending side 58 of another airbag 28, to a panel of another airbag 28, etc. The break-away stitching 60 secures airbags 28 adjacent each other in the inflated positions to each other, e.g., inhibiting an occupant 34 of the passenger cabin 36 from passing between such airbags 28 during a vehicle impact. The break-away stitching 60 (or other structure for releasably fixing the airbags 28 to each other, such as adhesive having a certain strength, perforated panels, etc.) may cease fixing adjacent airbags 28 to each other, e.g., by breaking, when one of such airbags 28 is inflated and not the other airbag 28, as shown in FIG. 4. To put it another way, relative moment between adjacent airbags 28 caused by inflation of one of such airbags 28, and not the other of such airbags 28, may release such airbags 28 from being fixed to each other.

The vehicle 20 may include one or more inflators 50 for inflating the airbags 28 to the inflated positions. The inflators 50 provides inflation medium to inflate the airbags 28 from the uninflated position to the inflated position. Each inflator 50 may be, for example, a pyrotechnic inflator that uses a chemical reaction to drive inflation medium to the airbag 28. The inflators 50 may be of any suitable type, for example, a cold-gas inflator. Each inflator 50 may be in fluid communication with one or more of the airbag 28, e.g., directly, through various piping, etc. For example, one inflator 50 may provide inflation medium to multiple airbags 28. As another example, one inflator 50 may only provide inflation medium to one airbag 28. The inflators 50 may be supported by the housing 48, the roof 22, or by any other suitable location of the vehicle 20.

Figure 6:
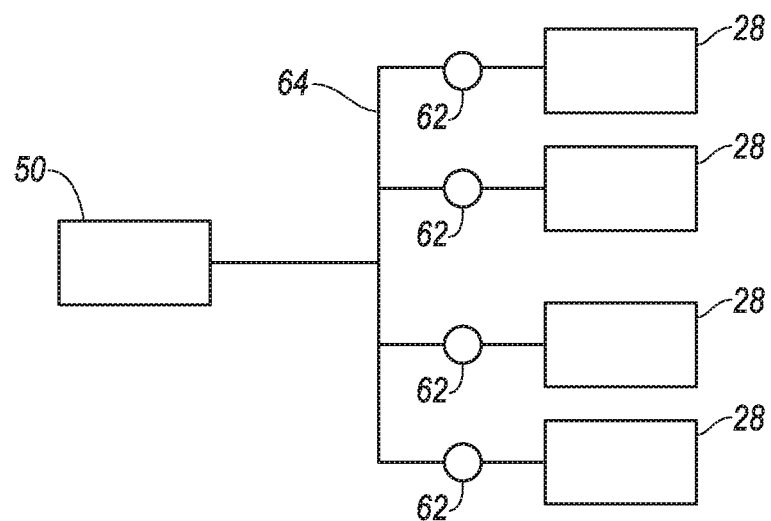
FIG. 6 is a schematic of the airbags, an inflator, and valves.

The airbag assembly 46 may include a plurality of shutoff valves 62 between one or more of the inflators 50 and one or more of the airbags 28. Each shutoff valve 62 actuates between an open position in which fluid is permitted to flow through the shutoff valve 62 and a closed position in which fluid is inhibited from flowing through the shutoff valve 62. Each shutoff valve 62 may actuate to the open position or the closed position in response to an instruction from the computer 52. The shutoff valves 62 enable inflation medium from the inflator 50 to be selectively provided to one or more of the airbags 28. For example, one or more of the inflators 50 may be in fluid communication with a common rail 64, shown in FIG. 6. The common rail 64 may be in fluid communication with one or more shutoff valves 62. Actuation of one or more of the valves 62 to the closed positions inhibits inflation medium from flowing from the common rail 64 to one or more airbags 28 in fluid communication with such shutoff valves 62. Actuation of one or more of the valves 62 to the open positions permits inflation medium to flow from the common rail 64 to one or more airbags 28 in fluid communication with such shutoff valves 62.

The vehicle 20 may include one or more occupancy sensors 66. The occupancy sensors 66 are configured to detect a position of occupants 34 of the vehicle 20, e.g., within the passenger cabin 36. For example, the occupancy sensors 66 may be weight sensors 66w supported by the seats 44. As another example, the occupancy sensor 66 may be a camera 66c positioned to capture images of the passenger cabin 36, e.g., supported by the roof 22, or any other suitable location of the vehicle 20.

Figure 7:
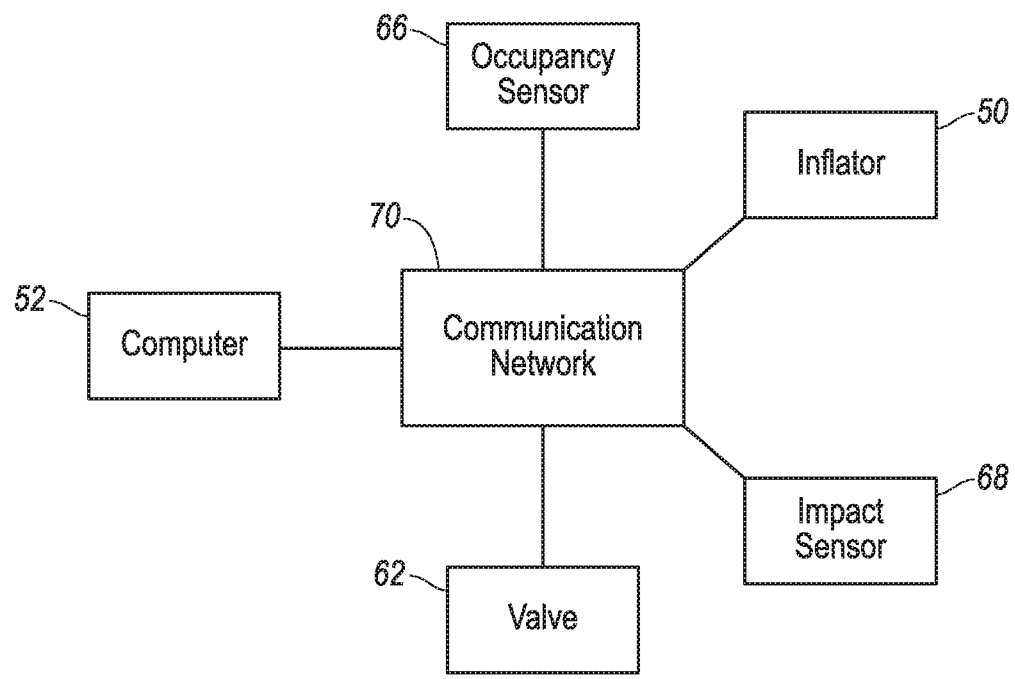
FIG. 7 is a block diagram of components of the vehicle.

With reference to FIG. 7, the vehicle 20 may include at least one impact sensor 68 for sensing impact of the vehicle 20. The impact sensor 68 may be in communication with the computer 52. The impact sensor 68 is configured to detect an impact to the vehicle 20. Alternatively or additionally to sensing impact, the impact sensor 68 may be configured to sense impact prior to impact, i.e., pre-impact sensing. The impact sensor 68 may be of any suitable type, for example, post contact sensors such as accelerometers, pressure sensors, and contact switches; and pre-impact sensors such as radar, LIDAR, and vision sensing systems. The vision systems may include one or more cameras, CCD image sensors, CMOS image sensors, etc. The impact sensor 68 may be located at numerous points in or on the vehicle 20.

The vehicle 20 may include a communication network 70. The communication network 70 includes hardware, such as a communication bus, for facilitating communication among vehicle 20 components, e.g., the computer 52, the impact sensor 68, the occupancy sensors 66, the inflators 50, the shutoff valves 62, etc. The communication network 70 may facilitate wired or wireless communication among the vehicle 20 components in accordance with a number of communication protocols such as controller area network (CAN), Ethernet, WiFi, Local Interconnect Network (LIN), and/or other wired or wireless mechanisms.

The computer 52 may be a microprocessor based computer implemented via circuits, chips, or other electronic components. For example, the computer 52 may include a processor, a memory, etc. The memory of the computer 52 may include memory for storing programming instructions executable by the processor as well as for electronically storing data and/or databases.

The computer 52 may by programmed to detect positions of occupants 34 of the passenger cabin 36, e.g., based on information from the occupancy sensors 66. For example, information from the weight sensor 66w in one of the seats 44 indicating weight above a threshold may indicate such seat 44 is occupied. As another example, image data from the camera 66c may be analyzed by the computer 52 using image recognition programming to identify positions of occupants 34 of the passenger cabin 36.

The computer 52 may be programmed to actuate one or more of the inflators 50, e.g., to provide an impulse to a pyrotechnic charge of one or more of the inflators 50 when the impact sensor 68 senses an impact of the vehicle 20. The computer 52 may selective actuate the inflators 50. To put it another way, the computer 52 may actuate some of the inflators 50, and not actuate others. For example, each inflator 50 may be associated with a network address, e.g., identifying a specific inflator 50 as a node on a network, and the computer 52 may transmit an actuation instruction to certain network addresses. Other programming, methods, and techniques may be used by the computer 52 to selectively actuate the inflators 50.

The computer 52 may be programmed to actuate one or more of the valves 62. For example, the computer 52 may transmit an instruction to one or more of the valves 62 indicating actuation to the open position or to the closed position. The computer 52 may selectively actuate the valves 62. For example, each valve 62 may be associated with a network address, e.g., identifying a specific valve 62 as a node on a network, and the computer 52 may transmit an actuation instruction to certain network addresses. Other programming, methods, and techniques may be used by the computer 52 to selectively actuate the valves 62.

The computer 52 may be programmed to select one or more airbags 28 of the rows 24, 26, 30, 32, 54, 56 of airbags 28 for inflation based on a detected position of occupants 34 in passenger cabin 36. For example, the rows 24, 26, 30, 32, 54, 56 of airbags 28 may define cells 72. To put it another way, the cells 72 may be bordered by airbags 28 of the rows 24, 26, 30, 32, 54, 56 of airbags 28. For example, one airbag 28 of each the first row 24, the second row 26, the third row 30 and the fourth row 32 may define one cell 72. The computer 52 may identify certain of the cells 72 based on the detected position of the occupants 34 in the passenger cabin 36. For example, the computer 52, the computer 52 identify one or more cells 72 that are above the detected positions of the occupants 34. The computer 52 may select the airbags 28 that border the identified cells 72 as a group of airbags 28 for inflation. The computer 52 may refine the group airbags 28 by removing from the group airbags 28 whose inflated positions conflict with the detected positions of the occupants 34 of the passenger cabin 36. For example, the computer 52 may remove airbags 28 positioned above the detected position of the occupants 34 from the group of airbags 28. To put it another way, the computer 52 may select the airbags 28 that border the identified cells 72, less any airbags 28 that would contact an occupant 34 in the inflated positions, as the group of airbags 28 for inflation. The computer 52 may use other techniques to select one or more airbags 28 of the rows 24, 26, 30, 32, 54, 56 of airbags 28 for inflation based on the detected position of occupants 34 in passenger cabin 36.

The computer 52 may be programmed to actuate the group of one or more airbags 28 selected for inflation. For example, the computer 52 may store a look up table or the like associating one or more of the airbags 28 of the rows 24, 26, 30, 32, 54, 56 of airbags 28 with a certain inflator 50, e.g., with a network address of a certain inflator 50, associating one or more of the airbags 28 of the rows 24, 26, 30, 32, 54, 56 of airbags 28 with a certain valve 62, e.g., with a network address of a certain valve 62.

To actuate the selected airbags 28, the computer 52 may transmit one or more instructions by transmitting instructions to certain network addresses associated with certain valves 62 and certain inflators 50, e.g., instructing actuation of one or more of the valve 62 to the open position or the closed position, instructing actuation of one or more of the inflators 50 to provide inflation medium, etc. For example, the computer 52 may transmit an instruction to one or more inflators 50 associated with the selected airbags 28 instructing actuation to provide inflation medium to the selected airbags 28. As another example, the computer 52 may transmit an instruction to one or more valves 62 associated with the selected airbags 28 to actuate to the open position and/or an instruction to one or more valves 62 not associated with the selected airbags 28 to actuate to the closed position. Next, the computer 52 may transmit an instruction to one or more inflators 50, e.g., to provide inflation medium via the valves 62 in the open position to the selected airbags 28.

The computer 52 may actuate the selected airbags 28 in response to detecting a vehicle impact. For example, the computer 52 may actuate the one or more inflators 50 to inflate the selected airbags 28 upon detecting a vehicle impact, e.g., based on information from the impact sensor 68. As another example, the computer 52 may actuate the valves 62 upon detecting a vehicle 20 pre-impact, e.g., based on information from the impact sensor 68 indicating that a vehicle impact is likely to occur, and then actuate the one or more inflators 50 upon detecting a vehicle impact, e.g., based on information from the impact sensor 68 indicating that a vehicle impact has occurred.

Figure 8:
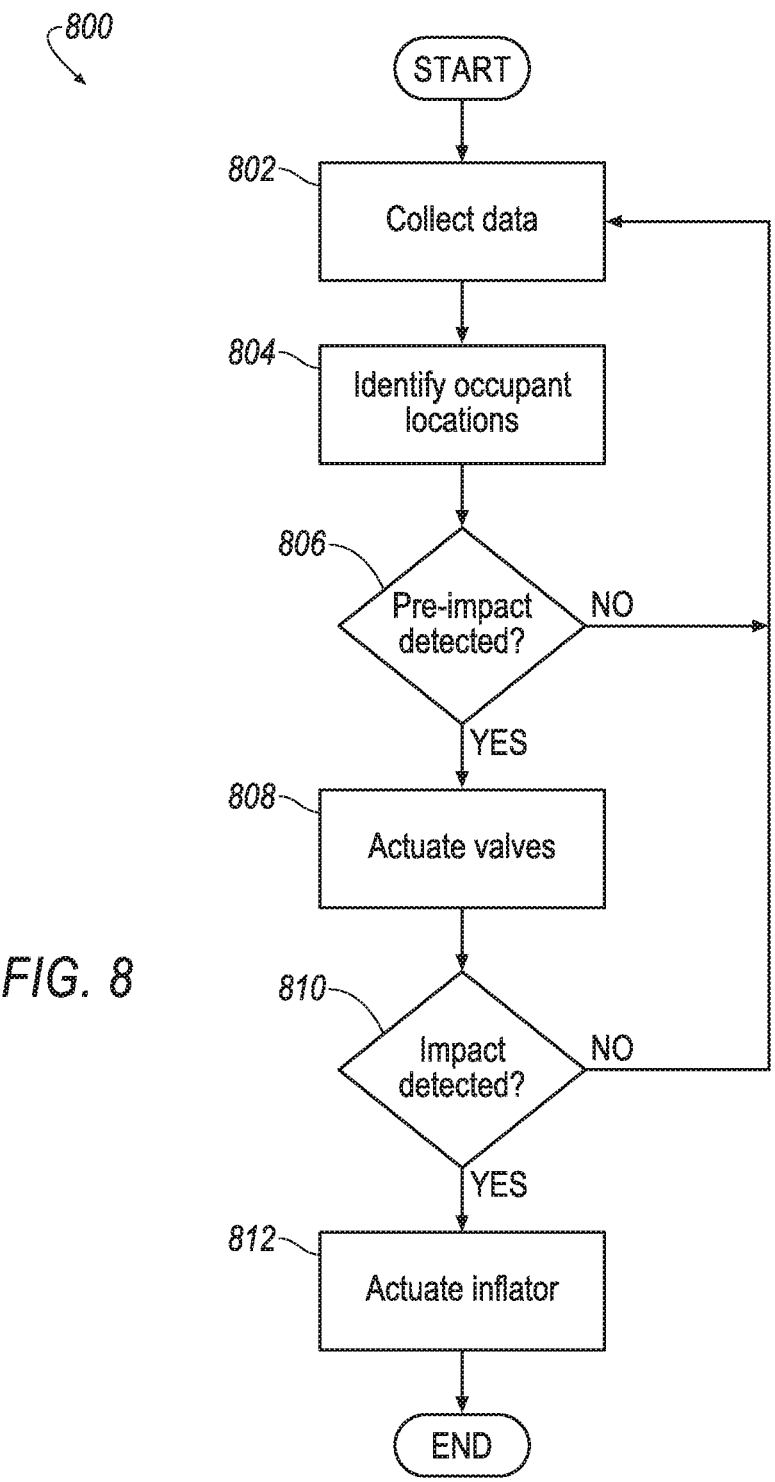
FIG. 8 is a flowchart for controlling the airbags.

FIG. 8 is a process flow diagram illustrating an exemplary process 800 for controlling the airbag assembly 46. The process 800 begins in a block 802 where the computer 52 receives data, e.g., from the occupancy sensor 66, the impact sensor 68, etc., via the communication network 70. The computer 52 may continue to receive data throughout the process 800. Throughout the process 800 in the present context means substantially continuously or at time intervals, e.g., every 10 milliseconds.

Next at a block 804 the computer 52 identifies positions of occupants 34 in the passenger cabin 36 based on data from the occupancy sensors 66, e.g., as described herein.

At a block 806 the computer 52 determines whether a pre-impact has been detected, e.g., based on data from the impact sensor 68. Detection of a pre-impact indicates that a vehicle impact is likely to occur. Upon determining a pre-impact has been detected the process 800 moves to a block 808. Upon determining a pre-impact has not been detected the process 800 returns to the block 802.

At the block 808 the computer 52 actuates one or more of the shutoff valves 62 to the open position and/or actuates one or more of the shutoff valves 62 to the closed position based on the identified positions of the occupants 34 from the block 804, e.g., as described herein.

At a block 810 the computer 52 determines whether a vehicle impact has been detected, e.g., based on data from the impact sensor 68. Upon determining a vehicle impact has been detected the process 800 moves to a block 812. Upon determining a vehicle impact has not been detected the process 800 returns to the block 802.

At the block 812 the computer 52 actuates one more inflators 50 to selectively inflate airbags 28 based on the identified positions of the occupants 34 from the block 804, e.g., as described herein.

Computing devices, such as the computer 52, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle, comprising:
   a roof;
   a first row and a second row of airbags supported by the roof and elongated along a vehicle-longitudinal axis, and one airbag of the first row and in an uninflated position is releasably fixed to another airbag of the first row and in an uninflated position; and
   a third row and a fourth row of airbags supported by the roof, elongated along a vehicle-lateral axis, and intersecting the first row and the second row of airbags.

2. The vehicle of claim 1, further comprising a first seat and a second seat spaced from each other along the vehicle-lateral axis, wherein one of the airbags of the first row is inflatable to an inflated position between the first seat and the second seat.

3. The vehicle of claim 1, further comprising a first seat and a second seat spaced from each other along the vehicle-longitudinal axis, wherein one of the airbags of the third row is inflatable to an inflated position between the first seat and the second seat.

4. The vehicle of claim 3, further comprising a third seat spaced from the first seat along the vehicle-lateral axis, wherein one of the airbags of the first row is inflatable to an inflated position between the first seat and the third seat.

5. The vehicle of claim 1, further comprising a passenger cabin, a processor, and a memory storing program instructions executable by the processor to actuate one or more airbags of the first row, the second row, the third row, or the fourth row based on a detected position of an occupant in passenger cabin.

6. The vehicle of claim 5, wherein the memory stores program instructions executable by the processor to actuate one or more valves between an inflator and one or more airbags of the first row, the second row, the third row, or the fourth row based on a detected position of an occupant in passenger cabin.

7. The vehicle of claim 1, further comprising a seat, wherein one airbag of each the first row, the second row, the third row, and the fourth row are inflatable to inflated positions and collectively define a polygon surrounding the seat in the inflated positions.

8. The vehicle of claim 1, further comprising a fifth row of airbags elongated along the vehicle-longitudinal axis and intersecting the third row and the fourth row of airbags.

9. The vehicle of claim 8, further comprising a sixth row of airbags elongated along the vehicle-lateral axis and intersecting the first row, the second row, and the fifth row of airbags.

10. The vehicle of claim 1, wherein one airbag of the first row is releasably fixed to one airbag of the third row.

11. An assembly, comprising:
    a first row and a second row of airbags elongated along a first axis; and
    a third row and a fourth row of airbags elongated along a second axis perpendicular to the first axis, and intersecting the first row and the second row of airbags;
    wherein one airbag of the first row and in an uninflated position is releasably fixed to one airbag of the third row and in an uninflated position.

12. The assembly of claim 11, wherein the first row, the second row, the third row, and the fourth row of airbags define a plurality of rectangles.

13. The assembly of claim 11, wherein one airbag of the first row is releasably fixed to another airbag of the first row.

14. The assembly of claim 11, wherein one airbag of the first row is releasably fixed to one airbag of the third row and one airbag of the fourth row.

15. The assembly of claim 11, wherein one airbag of the first row is releasably fixed to another airbag of the first row with breakaway stitching.

16. The assembly of claim 11, wherein one airbag of each the first, the second row, the third row, and the fourth row are inflatable to inflated positions and collectively define a polygon in the inflated positions.

17. The assembly of claim 11, further comprising a fifth row of airbags elongated along the first axis and intersecting the third row and the fourth row of airbags.

18. The assembly of claim 17, further comprising a sixth row of airbags elongated along the second axis and intersecting the first row, the second row, and the fifth row of airbags.

19. An assembly, comprising:
a first row and a second row of airbags elongated along a first axis, and one airbag of the first row and in an uninflated position is releasably fixed to another airbag of the first row and in an uninflated position; and
a third row and a fourth row of airbags elongated along a second axis perpendicular to the first axis, and intersecting the first row and the second row of airbags.

\* \* \* \* \*